(12) United States Patent
Hinz et al.

(10) Patent No.: US 9,490,970 B2
(45) Date of Patent: *Nov. 8, 2016

(54) METHODS AND SYSTEM FOR SECURE COMMUNICATION BETWEEN AN RFID TAG AND A READER

(71) Applicant: GIESECKE & DEVRIENT GMBH, Munich (DE)

(72) Inventors: Walter Hinz, Garching (DE); Klaus Finkenzeller, Unterföhring (DE); Martin Seysen, Munich (DE)

(73) Assignee: GIESECKE & DEVRIENT GMBH, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/962,179

(22) Filed: Dec. 8, 2015

(65) Prior Publication Data

US 2016/0094341 A1    Mar. 31, 2016

Related U.S. Application Data

(63) Continuation of application No. 14/385,525, filed as application No. PCT/EP2013/000421 on Feb. 13, 2013, now Pat. No. 9,277,406.

(30) Foreign Application Priority Data

Mar. 16, 2012  (DE) ................. 10 2012 005 427

(51) Int. Cl.
*G06K 7/08* (2006.01)
*H04L 9/06* (2006.01)
(Continued)

(52) U.S. Cl.
CPC ......... *H04L 9/0618* (2013.01); *G06K 7/10257* (2013.01); *H04L 9/0869* (2013.01);
(Continued)

(58) Field of Classification Search
CPC . H04L 9/0618; H04L 9/0869; H04L 9/3271; H04L 2209/24; G06K 7/10257
See application file for complete search history.

(56) References Cited

U.S. PATENT DOCUMENTS 6,088,453 A * 7/2000 Shimbo ................. G06F 7/721
380/28
6,405,923 B1 * 6/2002 Seysen ................. H04L 9/302
235/382

(Continued)

FOREIGN PATENT DOCUMENTS

DE    198 20 605 A1    11/1999

OTHER PUBLICATIONS

Arbit et al., "Toward Practical Public Key Anti-Counterfeiting for Low-Cost EPC Tags," IEEE International Conference on RFID, 2011, pp. 184-191.

(Continued)

*Primary Examiner* — Taghi Arani
*Assistant Examiner* — Sharon Lynch
(74) *Attorney, Agent, or Firm* — Workman Nydegger

(57) ABSTRACT

Methods and a system involve secure communication between an RFID tag and a reader via the over-the-air interface, and to corresponding RFID tags and corresponding readers. A modification of the Rabin method is employed wherein within the framework of the encryption of a plaintext M into which an identification element of the RFID tag or of an object furnished therewith is incorporated, there is computed by the RFID tag, the Montgomery residue (Montgomery reduction) of the square of the plaintext M modulo n with respect to a Montgomery base R, i.e. $C^* = M^2 R^{-1}$ mod n, and the resultant ciphertext $C^*$ is employed for authenticating the RFID tag. The modulus $n = p \cdot q$ is the public key of the reader, the prime numbers p, q are the private key of the reader, and the Montgomery base R is an integer that is larger than the modulus n.

16 Claims, 3 Drawing Sheets

(51) Int. Cl.
*H04L 9/30* (2006.01)
*H04L 9/32* (2006.01)
*H04W 12/06* (2009.01)
*G06K 7/10* (2006.01)
*H04L 9/08* (2006.01)

(52) U.S. Cl.
CPC ............ *H04L 9/302* (2013.01); *H04L 9/3247* (2013.01); *H04L 9/3271* (2013.01); *H04W 12/06* (2013.01); *H04L 2209/08* (2013.01); *H04L 2209/24* (2013.01); *H04L 2209/72* (2013.01); *H04L 2209/80* (2013.01); *H04L 2209/805* (2013.01)

(56) References Cited

U.S. PATENT DOCUMENTS

| | | | | |
|---|---|---|---|---|
| 7,050,579 B1* | 5/2006 | Koc | G06F 7/721 | 380/28 |
| 7,191,333 B1* | 3/2007 | Maddury | G06F 7/726 | 713/174 |
| 7,603,558 B2* | 10/2009 | Shimizu | G06F 7/728 | 380/28 |
| 8,265,266 B2* | 9/2012 | Ciet | G06F 7/723 | 380/28 |
| 8,291,223 B2* | 10/2012 | Ohyama | G06F 7/728 | 380/28 |
| 9,043,377 B2* | 5/2015 | Kim | G06F 5/01 | 708/491 |
| 9,152,383 B2* | 10/2015 | Bertoni | G06F 7/728 | |
| 2003/0044004 A1* | 3/2003 | Blakley | G06F 7/72 | 380/28 |
| 2003/0072442 A1* | 4/2003 | Blakley | G06F 7/723 | 380/28 |
| 2005/0041811 A1* | 2/2005 | Kobayashi | G06F 7/728 | 380/255 |
| 2006/0059220 A1* | 3/2006 | Koshy | G06F 7/728 | 708/491 |
| 2006/0126830 A1* | 6/2006 | Shimizu | G06F 7/728 | 380/28 |
| 2007/0206784 A1* | 9/2007 | Blakley | G06F 7/72 | 380/28 |
| 2009/0067617 A1* | 3/2009 | Trichina | G06F 7/723 | 380/28 |
| 2009/0097637 A1* | 4/2009 | Boscher | G06F 7/723 | 380/28 |
| 2009/0292921 A1* | 11/2009 | Braun | G06F 7/725 | 713/169 |
| 2010/0064142 A1* | 3/2010 | Matsuzaki | G06F 7/728 | 713/189 |
| 2011/0107097 A1* | 5/2011 | Braun | G06F 7/725 | 713/168 |
| 2013/0003973 A1* | 1/2013 | Shamir | G08B 13/2417 | 380/270 |
| 2013/0114806 A1* | 5/2013 | Bertoni | G06F 7/728 | 380/28 |
| 2015/0002260 A1* | 1/2015 | Brown | H04L 9/3252 | 340/5.8 |

OTHER PUBLICATIONS

Chen et al., "Standardized Signature Algorithms on Ultra-constrained 4-Bit MCU," IWSEC 2012, LNCS 7631, Nov. 7, 2012, pp. 37-50, Springer-Verlag Berlin Heidelberg.

German Search Report for corresponding German Application No. 102012005427.0, Nov. 15, 2012.

Gueron et al., "Applications of the Montgomery Exponent," Proceedings of the International Conference on Information Technology: Coding and Computing (ITCC'05), IEEE 2005, pp. 1-6.

Hinz et al., "Secure UHF Tags with Strong Cryptography," Sensomets 2013, 2nd International Conference on Sensor Networks, Feb. 21, 2013, pp. 1-9.

International Preliminary Report on Patentability for corresponding International PCT Application No. PCT/EP2013/000421, Sep. 16, 2014.

International Search Report for corresponding International PCT Application No. PCT/EP20131000421, May 14, 2013.

Lim, "Practical Broadcast Authentication Using Short-Lived Signatures in WSNs," WISA 2009, LNCS 5932, Aug. 25, 2009, pp. 366-383, Springer-Verlag Berlin Heidelberg.

Menezes et al., "Handbook of Applied Cryptography," CRC Press, 1996, Chapter 14 "Efficient Implementation", pp. 591-634.

Montgomery, "Modular Multiplication Without Trial Division," Mathematics of Computation, Apr. 1, 1985, pp. 519-521, vol. 44, No. 170.

Oren et al., "A Low-Resource Public-Key Identification Scheme for RFID Tags and Sensor Nodes," Proceedings of the Second ACM Conference on Wireless Network Security: Zurich, Switzerland, Mar. 16-18, 2009, pp. 59-68.

Shamir, "Memory Efficient Variants of Public-Key Schemes for Smart Card Applications", Advances in Cryptology—Eurocrypt '94, May 9-12, 1994, pp. 445-449, vol. 950.

* cited by examiner

MontgomerySquare algorithm:

```
acc = 0
i = 0
while (i < 2 * d + sd):
    // square m
    j = max(0, i + 1 - d);   k = i - j
    acc1 = 0
    while k > j:
        acc1 = acc1 + m_j * m_k
        j = j + 1;   k = k - 1
    acc = acc + 2 * acc1
    if j == k:
        acc = acc + m_j * m_j
    // Montgomery reduction
    if i < d + sd:
        k = min(i, d - 1);   j = i - k
        while k > 0:
            acc = acc + a_j * n_k
            j = j + 1;   k = k - 1
        a_i = (acc * n_inv) mod 2^bl
        acc = acc + a_i * n_0
    else:
        k = max(0, i - d - sd + 1);   j = i - k
        while k < d:
            acc = acc + a_j * n_k
            j = j - 1;   k = k + 1
        c_{i-d-sd} = acc mod 2^bl
    acc = acc / 2^bl
    i = i + 1
stop
```

Fig. 4

METHODS AND SYSTEM FOR SECURE COMMUNICATION BETWEEN AN RFID TAG AND A READER

BACKGROUND

This invention relates to methods and a system for secure communication between an RFID tag and a reader via the over-the-air interface, and to corresponding RFID tags and corresponding readers.

RFID technology ("radio frequency identification") enables in particular the automatic identification of persons and objects, and is becoming increasingly widespread in a multiplicity of applications, such as for example in supply chain management, in access control systems, in systems for theft protection of goods, in electronic ticketing, and the like. An RFID system normally consists of a portable data carrier in the form of an RFID tag (also called a transponder), which a person carries or is attached to an object and which stores an identification code uniquely identifying the RFID tag and/or the object (also known to the person skilled in the art as a Unique ID (UID), Tag-ID (TID) or "Unique Item Identifier" (UII)), and a reader for contactlessly reading out the identification code of the RFID tag. The reader is usually only one reader of a multiplicity of readers which are installed at different locations and can access, via a background system, data deposited there for a multiplicity of RFID tags.

In particular those inexpensive RFID tags intended for logistics applications and for supply chain management, which are normally passive RFID tags that draw the energy required for operation from the electromagnetic field of a reader, frequently offer no cryptographic functions, so that an authentication of an RFID tag to a reader is not possible with such RFID tags. This is the case for example with UHF RFID tags, which are known to the person skilled in the art under the name Class-1 Gen-2 EPC tags, i.e. RFID tags that are configured according to the standard EPC Class 1 Generation 2 or the newer standard ISO/IEC 18000-63. As is known to the person skilled in the art, the term "Class-1 Gen-2 EPC tags" also includes tags according to the standard ISO/IEC 18000-63. In such RFID tags the unique identification code is referred to as the EPC ("Electronic Product Code"), which is usually a bit sequence consisting of 96 bits and deposited in a respective RFID tag. Upon a readout of an RFID tag the EPC is transferred to a reader in plaintext without authentication and can thus be intercepted both actively, by a reader of an unauthorized third party, and passively, by a third party monitoring the insecure communication channel, i.e. the over-the-air interface, between the RFID tag and a reader.

This leads to two potential problems, namely, firstly, that the presence and the position of an RFID tag can be detected and tracked by an unauthorized third party, which is also referred to as tracking of an RFID tag, and, secondly, that a third party can copy the read-out EPC into a new, forged RFID tag and can thus pass off the new, forged RFID tag as the tag from which the EPC was originally read out, which is also referred to as cloning an RFID tag.

For securing the communication between an RFID tag and a reader it is expedient to use cryptographic methods which enable, firstly, a unilateral or mutual authentication between the RFID tag and the reader and, secondly, an encryption of the communication via the over-the-air interface. Cryptographic methods are subdivided into symmetric methods, in which transmitter and receiver employ the same secret key, and public-key or asymmetric methods, in which the transmitter employs a public key and the receiver a secret or private key. However, symmetric methods are known to involve the problem that the common secret key must be deposited securely both in an RFID tag and in a reader or a background system connected thereto, which requires an elaborate key management in systems with a multiplicity of RFID tags and a multiplicity of readers, this being unnecessary in public-key or asymmetric methods. Such a key management can also be omitted in systems employing a symmetric method if the same master key is deposited in all RFID tags and in the background system. However, this involves the danger that as soon as the master key of an RFID tag has been established the whole system is broken. This danger does not exist in public-key methods.

A known public-key method is the Rabin method which, like the frequently used RSA method, utilizes modular exponentiation as its basis. Since the computation of the encryption is substantially simpler, i.e. less compute-intensive, in the Rabin method than in the RSA method, the Rabin method is preferable to the RSA method in particular where the entity carrying out the encryption, i.e. the transmitter of an encrypted message, has only limited processor power, as is the case for example with a limited-resource RFID tag that is to communicate securely with a reader coupled to a background system.

In the Rabin method the secret key consists of two prime numbers p and q, chosen in practice to be sufficiently large, which are linked with each other via a certain congruence condition. The product $n=p \cdot q$ of the two prime numbers p and q defines the modulus n and simultaneously represents the public key. Expediently, the prime numbers p and q are approximately equally large. According to the Rabin method, a plaintext M to be transmitted is encrypted by modular squaring and applying the modulo operation, i.e. the ciphertext C results from the plaintext M according to the following formula: $C=M^2$ mod n.

The security of the Rabin method is based on the fact that it is very difficult to compute the modular square root from the ciphertext C without knowing the prime numbers p and q. However, this is only the case when the plaintext M is not substantially smaller than the modulus n. The modulo operation following squaring prevents the possibility of decryption by simply taking the root.

Since in the Rabin method the encryption by the transmitter involves a modular squaring, the receiver must for decryption compute the modular square root of the ciphertext C. As is known, this can be done utilizing the Chinese remainder theorem (CRT). As the person skilled in the art knows, this results in four square roots from which one must be selected as the original plaintext M. For this purpose, the "right" plaintext M can be marked for the receiver for example by means of a suitable identifier, check sum or the like.

As results from the hereinabove described formula for computing the ciphertext C in the Rabin method, the transmitter must normally carry out an arbitrary-precision division to carry out the modulo operation. However, such an arbitrary-precision division can only be realized very elaborately in particular on simple microprocessors as are employed with RFID tags.

The publication "A Low-Resource Public-Key Identification Scheme for RFID Tags and Sensor Nodes" by Y. Oren and M. Feldhofer in D. A. Basin, S. Capkun, and W. Lee, editors, *WISEC*, pages 59-68, ACM 2009, proposes under the name of WIPR method a modification of the conventional Rabin method which is intended in particular for securing the communication between a limited-resource RFID tag with a simple processor and a reader. Compared with the hereinabove described conventional Rabin method, the WIPR method has the advantage of employing for computing the ciphertext, instead of an elaborate arbitrary-precision division which is very compute-intensive and can thus hardly be implemented on simple microprocessors as are usually found on RFID tags, arbitrary-precision multiplications, which are substantially faster to execute than divisions and can also be realized more simply in terms of hardware.

According to the WIPR method, the ciphertext C' is computed by the transmitter, e.g. an RFID tag, generating a random number r, multiplying it by the modulus n and adding the result to the square of the plaintext M, i.e. $C'=M^2+r \cdot n$. In so doing, an identification code of the RFID tag is incorporated into the plaintext M and the size of the random number r is so chosen that the product r·n is more than twice as large as the modulus n. In contrast to the conventional Rabin method, the square of the plaintext M is thus not masked in the WIPR method by carrying out the modulo operation which involves an arbitrary-precision division, but by adding the product r·n with the suitably chosen random number r.

The publication A. Shamir, "Memory Efficient Variants of Public-Key Schemes for Smart Card Applications", in A. D. Santis, editor, Advances in Cryptology—EUROCRYPT '94, Springer LNCS, Vol. 950, pages 445-449, has shown that a method like the WIPR method is just as secure as the conventional Rabin method provided the random number r is chosen randomly from a sufficiently large number range.

However, the price paid by the WIPR method for the advantage of avoiding an arbitrary-precision division is that the ciphertext C' will normally be very long due to the omission of the modulo operation when squaring the plaintext M and due to the product of the modulus n with the sufficiently large random number r, which slows down the authentication operation between an RFID tag and a reader since a larger amount of data must be transferred from the RFID tag to the reader.

SUMMARY

Against this background, the present invention is based on the problem of providing improved methods and an improved system for secure communication between an RFID tag and a reader via the over-the-air interface which protect the RFID tag in particular from being tracked and/or cloned. Further, an accordingly configured RFID tag and an accordingly configured reader are to be provided.

The invention starts out from the basic idea that for secure communication between an RFID tag and a reader there is employed a modification of the Rabin method by which, within the framework of the encryption of a plaintext M into which an identification element of the RFID tag or of an object furnished therewith is incorporated, there is computed by the RFID tag, instead of the square of the plaintext M modulo n, i.e. $M^2$ mod n, the Montgomery residue (Montgomery reduction) of the square of the plaintext M modulo n with respect to a Montgomery base R, i.e. $C^*=M^2R^{-1}$ mod n, and the resultant ciphertext C* is employed for authenticating the RFID tag. The modulus n=p·q is the public key of the reader, the prime numbers p, q are the private key of the reader, and the Montgomery base R is an integer that is larger than the modulus n. In this connection the Montgomery base R is normally a power of two.

On the basis of the hereinabove described basic idea of the present invention there is provided according to a first aspect of the invention a method for secure communication between an RFID tag and a reader, wherein the method comprises the following steps that are carried out in the RFID tag. Encrypting a plaintext M into which an identification element of the RFID tag or of an object furnished therewith is incorporated, for computing a ciphertext C* by computing the Montgomery residue of the square of the plaintext M modulo n with respect to a Montgomery base R, i.e. $C^*=M^2R^{-1}$ mod n, and sending out an authentication message to the reader, the authentication message being based on the ciphertext C*.

Further, on the basis of the hereinabove described basic idea of the present invention there is provided according to a second aspect of the invention a method for secure communication between an RFID tag and a reader, wherein the method comprises the following steps that are carried out in the reader. Receiving from the RFID tag an authentication message which is based on an encrypted plaintext M into which an identification element of the RFID tag or of an object furnished therewith has been incorporated, and decrypting the encrypted plaintext M wherein the decrypting step comprises multiplying the encrypted plaintext M by a Montgomery base R and subsequently carrying out the modulo operation with the modulus n. Preferably, the decrypting step further comprises subsequently taking the square root modulo n analogously to the conventional Rabin method.

Furthermore, on the basis of the hereinabove described basic idea of the present invention there is provided according to a third aspect of the invention an RFID tag for secure communication with a reader. The RFID tag comprises a processor unit and a storage unit. In the storage unit an identification element is deposited. The processor unit is configured for encrypting a plaintext M into which the identification element of the RFID tag or of an object furnished therewith is incorporated, for computing a ciphertext C* by computing the Montgomery residue of the square of the plaintext M modulo n with respect to a Montgomery base R, i.e. $C^*=M^2R^{-1}$ mod n, and for sending an authentication message to the reader, the authentication message being based on the ciphertext C*.

Further, on the basis of the hereinabove described basic idea of the present invention there is provided according to a fourth aspect of the invention a reader for secure communication with an RFID tag. The reader comprises a processor unit which is configured for receiving from the RFID tag an authentication message which is based on an encrypted plaintext M into which an identification element of the RFID tag or of an object furnished therewith has been incorporated, and for decrypting the encrypted plaintext, wherein upon the decryption the encrypted plaintext M is multiplied by a Montgomery base R and subsequently the modulo operation with the modulus n is carried out. Preferably, the processor unit of the reader, for decrypting the encrypted plaintext, is further configured for subsequently taking the square root modulo n analogously to the conventional Rabin method.

Finally, on the basis of the hereinabove described basic idea of the present invention there is provided according to a fifth aspect of the invention a system for secure communication with at least one RFID tag according to the third aspect of the invention and at least one reader according to the fourth aspect of the invention.

As mentioned hereinabove, the modulus n=p·q is the public key of the reader, the prime numbers p, q are the private key of the reader, and the Montgomery base R is an integer that is larger than the modulus n.

Preferably, the authentication message transferred from the RFID tag to the reader contains the encrypted plaintext M in the form of the ciphertext C* with C*=$M^2R^{-1}$ mod n.

According to preferred embodiments of the invention, there are further incorporated into the plaintext M a first random number RND1 generated by the reader and a second random number RND2 generated by the RFID tag. The first random number RND1 is preferably transferred to the RFID tag as a challenge within the framework of a challenge-response method. In this preferred embodiment, the data incorporated into the plaintext M, in particular the identification element of the RFID tag, the first random number RND1 and the second random number RND2, are preferably scrambled by means of an interleaving operation in order to distribute the random data stemming from the reader and from the RFID tag randomly over the plaintext M. Through the contained random components RND1 and RND2 it is achieved that both the plaintext M and the ciphertext C* are different upon each readout operation, i.e. upon each query.

Advantageously, the RFID tag is configured such that the RFID tag can begin with the encryption during the read-in of the challenge. Further, the first bits or bytes of the ciphertext C* computed by the RFID tag can already be transferred to the reader while the subsequent bits or bytes of the ciphertext C* are still being computed by the RFID tag. In other words, the RFID tag is preferably configured for computing the ciphertext C* bit for bit successively and transmitting the already computed bits of the ciphertext C* to the reader as part of the authentication message, so that no intermediate stores (registers) are required and the communication protocol can be carried out faster.

Electively, there is further incorporated into the plaintext M a digital signature of the identification element of the RFID tag, which is preferably deposited in the memory of the RFID tag and can be checked by the reader.

According to preferred embodiments, the modulus n is chosen, for saving computing time, as follows: n=1 (mod $2^{bl\cdot nd}$), where nd is an integer with 1≤nd<d, bl is the word width of the processor unit of the RFID tag in bits, and d is the length of the modulus n in word widths of the processor unit.

In practice, the number R is typically chosen for a given modulus n as the next larger power of two, i.e. for a modulus n consisting of k bits (e.g. 1024 bits) R=$2^k$ is chosen. According to preferred embodiments of the invention, R=$2^{bl\cdot(d+sd)}$ is set, where bl is the word width of the processor unit of the RFID tag, d is the length of the modulus n in word widths of the processor unit, and sd is a security parameter which is so chosen that it holds that bl·sd≥1, preferably bl·sd≥10, and most preferably bl·sd≥100.

Preferably, the reader is only one reader of a multiplicity of readers which are interconnected via a background system and can access data deposited in the background system, which are respectively linked with a respective RFID tag.

According to a preferred embodiment, the RFID tag is a UHF tag according to the standard ISO/IEC 18000-63 or the standard Class-1 Gen-2 EPC.

The present invention has in particular the following advantages. The encryption according to the invention requires no modular reduction, i.e. no division, and no more data are generated than corresponds to the length of the modulus n. Further, the invention offers the possibility of beginning with computation of the ciphertext C* before the RFID tag has received all data entering into the computation, and then beginning to transmit the result of this computation to the reader before the computation of the ciphertext C* is completed, thereby enabling data transfer and computation to be executed in parallel and transaction time to be saved.

Since the methods according to the invention are public-key methods, it is only necessary to deposit a public key on the RFID tag, so that the security of the system is not endangered if an attacker obtains this public key. A further advantage of the invention is that for decryption of the ciphertext C* a reader does not have to be connected to a background system, since the private key required therefor can be deposited on the reader locally. Finally, a further advantage is that the invention can be implemented on conventional readers without hardware modifications.

As the person skilled in the art will appreciate, the preferred embodiments described hereinabove and defined in the subclaims can be implemented advantageously within the framework of the first aspect of the invention, within the framework of the second aspect of the invention, within the framework of the third aspect of the invention and within the framework of the fourth aspect of the invention.

BRIEF DESCRIPTION OF THE DRAWINGS

Further features, advantages and objects of the invention will emerge from the following detailed description of several exemplary embodiments and alternative embodiments. Reference is made to the drawings, in which there are shown.

DETAILED DESCRIPTION OF VARIOUS EMBODIMENTS

Figure 1:
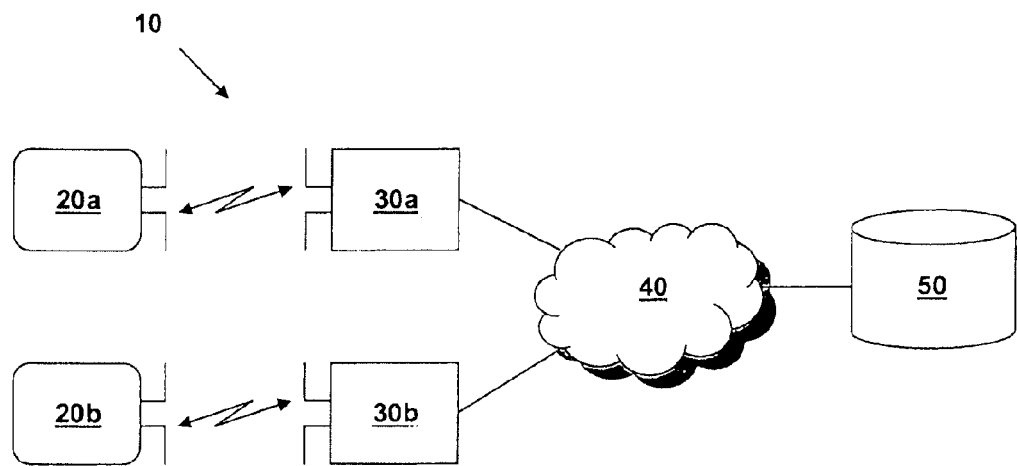
FIG. 1 a schematic representation of a system for secure communication between an RFID tag and a reader according to a preferred embodiment of the invention, FIG. 2 a schematic detail view of an RFID tag of the system of FIG. 1, FIG. 3 a schematic representation of a preferred embodiment of a method according to the invention for secure communication between an RFID tag and a reader of the system of FIG. 1, and FIG. 4 an algorithm for implementing the method according to the invention of FIG. 3.

FIG. 1 shows a schematic representation of a system 10 for communication between an RFID tag and a reader according to a preferred embodiment of the invention. The system 10 might be for example an electronic ticketing system in which an RFID tag represents an electronic ticket which a person carries.

The system 10 comprises by way of example two RFID tags, namely the RFID tag 20*a* and the RFID tag 20*b*, which can respectively communicate via the over-the-air interface with a reader 30*a* and a reader 30*b*, in whose communication range or reading range the respective RFID tag 20*a*, 20*b* is located. Preferably, the RFID tags 20*a*, 20*b* are RFID tags according to the standard ISO/IEC 18000-63 or EPC Class 1 Generation 2, which are also referred to as EPC tags here.

The readers 30*a*, 30*b* are connected via a suitable communication network 40 to a background system or back-end system 50 in which data linked with the RFID tags 20*a*, 20*b* are preferably deposited in a database. Besides the readers 30*a*, 30*b* there can also be integrated into the system 10 represented in FIG. 1 a multiplicity of further readers which can be in communication with the background system 50, and access the data deposited there, via the communication network 40. For clarity's sake, FIG. 1 represents only two RFID readers 30*a*, 30*b* and two RFID tags, namely the RFID tags 20*a*, 20*b*. However, the system 10 represented in FIG.

1 is of course configured for a multiplicity of further RFID tags being operable in this system 10 besides the RFID tags 20a, 20b.

Figure 2:
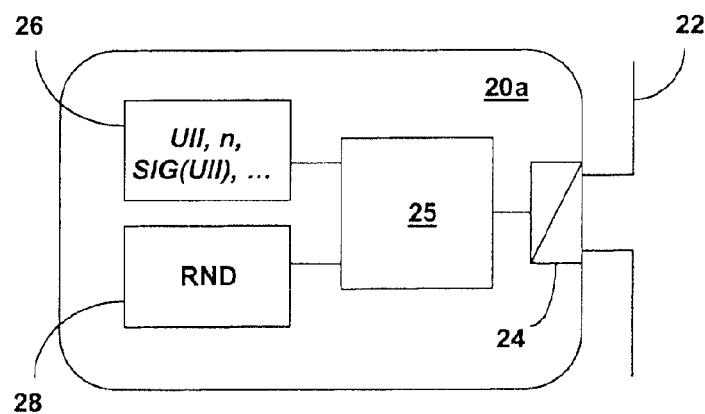

FIG. 2 shows a detail view of the exemplary RFID tag 20a of the system 10 of FIG. 1, in which the components of the RFID tag 20a that are essential for the present preferred embodiment of the invention are represented schematically. The RFID tag 20a, whose structure can preferably be, but is not necessarily, identical to the structure of the RFID tag 20b, comprises an external or internal antenna device 22 for the respective communication via the over-the-air interface with the readers 30a, 30b of the system 10 of FIG. 1. The antenna device 22 is in communication via an input-output interface 24 with a processor unit 25 which can access a memory 26 of the RFID tag 20a for storing and reading out data.

In the memory 26 of the RFID tag 20a, as represented in FIG. 2, which may be for example a ROM and/or EEPROM (flash memory), there are deposited, or can be deposited, the data that are employed for the preferred secure communication according to the invention, described hereinafter in detail, of the RFID tag 20a with one of the readers 30a, 30b. In particular, there is deposited in the memory 26 of the RFID tag 20a at least one identification element which enables a unique identification of the RFID tag 20a and/or of the object furnished with the RFID tag 20a. The identification element deposited in the memory 26 may be for example a TID ("Tag Identifier") element or a UII ("Unique Item Identifier") element, preferably the Electronic Product Code (EPC) known to the person skilled in the art from the EPC standard. As can be seen in FIG. 2, there are further deposited in the memory 26 of the RFID tag 20a a public key n and preferably a digital signature of the identification element deposited in the memory 26, for example the digital signature of the UII element, which is marked as SIG(UII) in FIG. 2, whose purpose will be described in more detail hereinafter in connection with FIG. 3.

Preferably, the RFID tag 20a further comprises a random number generator 28 (RND) for generating random numbers which are employed for the secure communication between the RFID tag 20a and one of the readers 30a, 30b, as will be described in detail hereinafter in connection with FIG. 3. Although the random number generator 28 is represented as a separate unit in FIG. 2, the person skilled in the art will appreciate that the random number generator 28 could also be a part of the processor unit 25 or be implemented as a software module of the processor unit 25. Likewise, the memory 26 could be configured as part of the processor unit 25.

Besides the access to the memory 26 of the RFID tag 20a and the internal communication with the input-output interface 24 and the random number generator 28 for example via a bus system, the processor unit 25 of the RFID tag 20a is preferably further configured for carrying out or initiating the steps, described hereinafter in connection with FIG. 3, on the part of the RFID tag 20a in order to enable a secure communication between the RFID tag 20a and one of the readers 30a, 30b.

Figure 3:
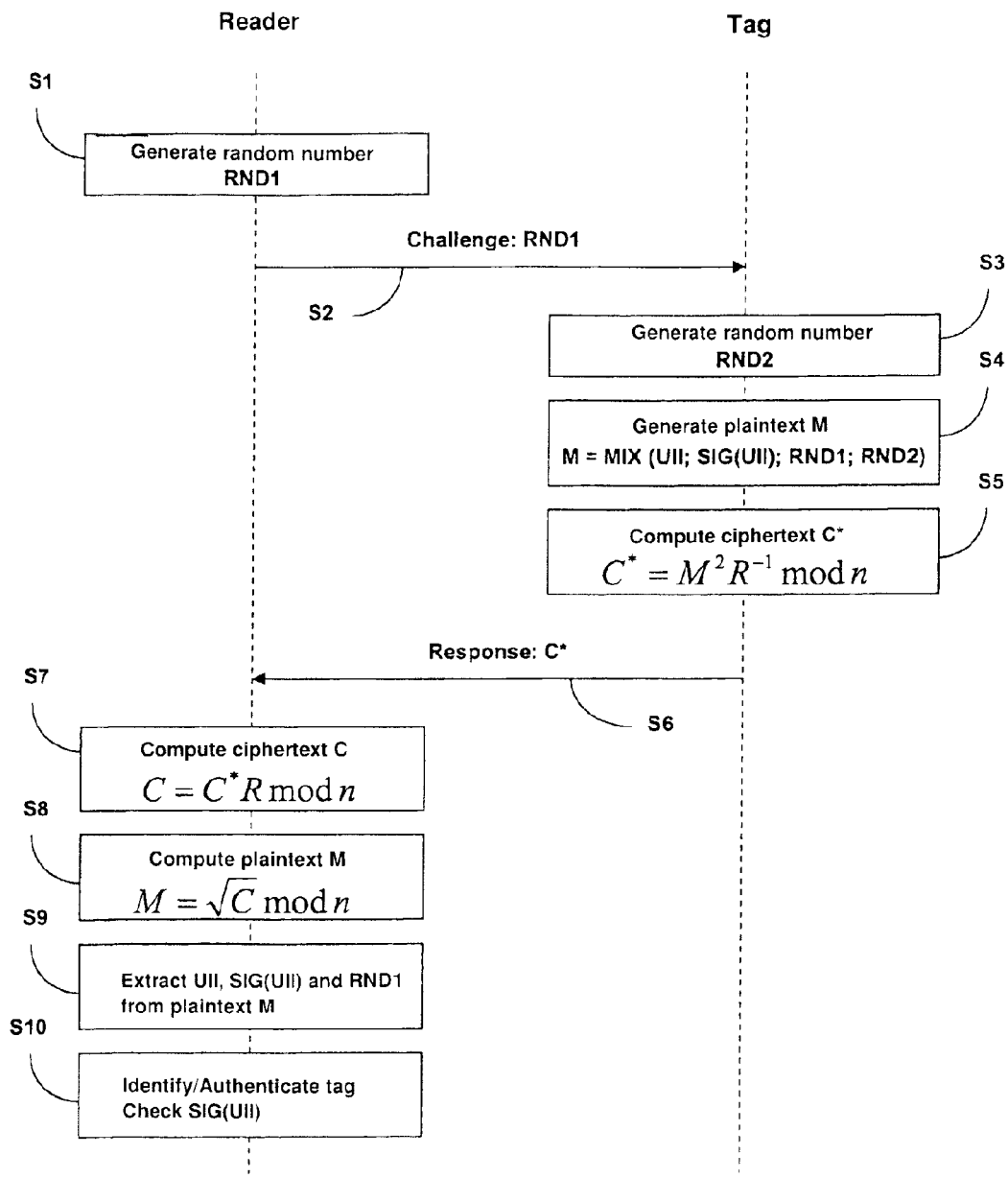

As soon as a reader, for example the reader 30a, detects that an RFID tag, for example the RFID tag 20a, is located in its communication range, the communication protocol sketched in FIG. 3 is launched by the reader 30a. In so doing, the reader 30a, in step S1 of FIG. 3, first generates a first random number RND1 (also called a nonce) and transmits this first random number RND1 to the RFID tag 20a as a challenge within the framework of a challenge-response method, in step S2 of FIG. 3. Preferably in reaction to the reception of the first random number RND1 from the reader 30a, the RFID tag 20a generates a second random number RND2, in step S3 of FIG. 3. This second random number RND2 is preferably generated by the random number generator 28 of the RFID tag 20a, independently of the first random number RND1.

As to be described hereinafter in detail, preferably both the first random number RND1 contributed by the reader 30a and the second random number RND2 contributed by the RFID tag 20a are incorporated into the plaintext M to be encrypted by the RFID tag 20a and transferred to the reader 30a. Since the plaintext M to be encrypted thus has a random element varying from readout operation to readout operation, a different encrypted plaintext M, i.e. a different ciphertext, is also transferred from the RFID tag 20a to the reader 30a upon each readout operation. This can prevent an attacker from being able to identify an RFID tag by an invariable ciphertext sent out by this RFID tag. Furthermore, the first random number RND1 generated by the reader 30a has, as mentioned hereinabove, the function of a challenge within the framework of a challenge-response method known to the person skilled in the art for authenticating the RFID tag 20a to the reader 30a.

In step S4 of Figure S3, there is generated by the RFID tag 20a a plaintext M to be encrypted which enables the reader 30a which receives and decrypts the encrypted plaintext M to identify the RFID tag 20a. For this purpose, there is incorporated into the plaintext M in particular an identification element which enables a unique identification of the RFID tag 20a and/or of the object furnished with the RFID tag 20a. In the preferred embodiment represented in the figures, the identification element is the UII element deposited in the memory 26 of the RFID tag 20a.

In order for the reader 30a to be able to check the authenticity of the UII element of the RFID tag 20a, a digital signature of the UII element is preferably further incorporated into the plaintext M. Preferably, a digital signature of the UII element is deposited in the memory 26 of the RFID tag 20a, as indicated in FIG. 2 with the designation SIG (UII), so that it does not have to be recomputed by the RFID tag 20a upon each readout operation. As is known to the person skilled in the art, a digital signature of the UII element of the RFID tag 20a can be created for example by applying a private key to the UII element within the framework of a public-key method. For the check of the digital signature of the UII element by the reader 30a, a public key matching the private key is applied to the digital signature.

Preferably, there are further incorporated into the plaintext M, besides the UII element and the digital signature of the UII element, both the first random number RND1 provided by the reader 30a and the second random number RND2 provided by the RFID tag 20a, as described hereinabove. This is preferably effected by means of an interleaving operation MIX implemented on the processor unit 25 of the RFID tag 20a, which is configured for mixing or scrambling with each other the UII element, the digital signature of the UII element, the first random number RND1 and the second random number RND2. The mixture by the interleaving operation MIX can be effected for example at the byte level. The result of applying the interleaving operation MIX to the UII element, the digital signature of the UII element, the first random number RND1 and the second random number RND2 is the plaintext M to be encrypted. The bits of the plaintext M stemming from the random numbers RND1 and RND2 can be viewed as padding bits. It may be advantageous to suitably choose the lengths of the random numbers RND1 and RND2 to achieve that the plaintext M has the same length as the modulus n, for example 1024 bits.

After the plaintext M containing the UII element, inter alia, has been created by the RFID tag 20*a*, in step S4 of FIG. 3, this plaintext M is encrypted by the RFID tag 20*a* as follows, in step S5 of FIG. 3. As in the conventional Rabin method, the plaintext M is first squared. For generating the ciphertext, the result of this squaring is subsequently not subjected to a modulo operation with the modulus n as in the conventional Rabin method, however, but the Montgomery residue of the squared plaintext is formed. In general the Montgomery residue (Montgomery reduction) of an integer T modulo n with respect to an integer R is defined as $TR^{-1}$ mod n. where R is larger than the modulus n, R and the modulus n are coprime (i.e. ggT(R,n)=1) and $0 \leq T < nR$ (see chapter 14.3.2 of A. J. Menezes, P. C. van Oorschot, S. C. Vanstone, "*Handbook of Applied Cryptography*"). In the literature the integer R is sometimes referred to as the Montgomery base.

Within the framework of the present invention, the Montgomery residue of the square of the plaintext M modulo n with respect to the integer R, as computed by the RFID tag 20*a*, is defined as the ciphertext C*, i.e. $C^* = M^2 R^{-1}$ mod n, where the integer R is chosen larger than the modulus n, as mentioned hereinabove. In practice, the number R is typically chosen for a given modulus n as the next larger power of two, i.e. for a modulus n consisting of k bits (e.g. 1024 bits) $R = 2^k$ is chosen. Further options for the number R that are preferred according to the present invention will be described hereinbelow.

After the ciphertext $C^* = M^2 R^{-1}$ mod n has been computed by the RFID tag 20*a*, in step S5 of FIG. 3, the thus computed ciphertext C* is transmitted to the reader 30*a*, in step S6 of FIG. 3, as a response to the challenge sent in step S2 of FIG. 3. The person skilled in the art will appreciate, however, that instead of the ciphertext $C^* = M^2 R^{-1}$ mod n, a ciphertext C further processed again by the RFID tag 20***a* could in principle also be transferred to the reader 30*a*, provided the RFID tag 20*a* and the reader 30*a* have agreed on how the reader 30*a* can compute back to the ciphertext $C^* = M^2 R^{-1}$ mod n from the ciphertext C further processed and transmitted by the RFID tag 20***a*.

In step S7 of FIG. 3, the ciphertext C* transmitted by the RFID tag 20 in step S6 is first multiplied by R and subsequently the modulo operation with the modulus n carried out, i.e. C*R mod n. Inserting for C* the expression described in connection with step S5 of FIG. 3, one obtains: C*R mod n = $M^2 R^{-1}$ R mod n = $M^2$ mod n. As the person skilled in the art will appreciate, the last expression $M^2$ mod n is the ciphertext of the known Rabin method, which is referred to as ciphertext C here. In other words, in step S7 of FIG. 3 the ciphertext $C = M^2$ mod n known from the known Rabin method is obtained by multiplying the ciphertext C* transmitted by the RFID tag 20 by R and subsequently carrying out the modulo operation with the modulus n.

As in the case of the classical Rabin method, the plaintext M originally generated by the RFID tag 20*a* in step S4 can now be established by the reader 30*a*, in step S8 of FIG. 3, by computing the square root of the ciphertext C modulo n determined in step S7. As described hereinabove, the Chinese remainder theorem (CRT) can be utilized for this purpose, employing the private key available to the reader 30*a* in the form of the prime numbers p and q, in order to compute the four square roots of the ciphertext C. Preferably, it is made clear to the reader 30*a* by means of a suitable marking which of the four square roots of the ciphertext C is the plaintext M originally generated by the RFID tag 20*a*.

For example, the first random number RND1 transmitted by the reader 30*a* can be employed for selecting the right square root, i.e. the right plaintext M.

As described hereinabove, the plaintext M is generated in step S4 of FIG. 3 by carrying out the interleaving operation MIX. As the person skilled in the art will appreciate, this interleaving operation must be undone or inverted again on the part of the reader 30*a* to enable the UII element of the RFID tag 20*a*, the digital signature SIG(UII) of the UII element, the first random number RND1 and the second random number RND2 to be extracted from the plaintext M. This inversion of the interleaving operation MIX and the extraction of the information contained in the plaintext M is preferably effected in step S9 of FIG. 3. Of course the RFID tag 20*a* and the reader 30*a* must have agreed on which interleaving operation is employed in step S4 of FIG. 3 to be able to apply the inverse function thereto in step S9 of FIG. 3.

After step S9 of FIG. 3 has been successfully carried out, the UII element of the RFID tag 20*a*, the digital signature of the UII element, the first random number RND1 and the second random number RND2 are available to the reader 30*a*. Using these available elements, the reader 30*a* can identify and authenticate the RFID tag 20*a*. Preferably, in step S10 of FIG. 3, the intactness of the UII element of the RFID tag 20*a* is further checked by the reader 30*a*, by the reader 30*a* checking the digital signature of the UII element. It is conceivable that for this purpose the reader 30*a* accesses the background system 50 to find on the basis of the UII element of the RFID tag 20*a* a public key that matches the private key with which the digital signature of the UII element of the RFID tag 20*a* was originally created.

Hereinafter a preferred implementation of the computation according to the invention of the ciphertext C*, i.e. of the encryption of the plaintext M, by the RFID tag 20*a* will be described with reference to FIG. 4, the sequence of this encryption being roughly dividable into three sections.

In a first section of the encryption the plaintext M is processed successively, from the lowest-order to the highest-order byte. When the interleaving operation MIX is configured for interspersing the first random number RND1 of the reader 30*a* into the plaintext M in a uniformly distributed manner, the first encryption section can already be begun after reception of the first byte of the random number RND1, computing being done as long as bytes of the plaintext M are available. After reception of the next byte of the random number RND1 from the reader 30*a*, the encryption is computed further until the total plaintext M has been encrypted.

In a second section of the encryption, a system-wide agreed number of additional Montgomery steps is effected, i.e. the number R is chosen so as to be accordingly larger than the next power of two available above the modulus n. The reason for this measure is that there is less probability that the final result of the encryption will be larger than the modulus n (which an attacker could of course recognize and use as an opportunity for a side channel attack). The probability of such an overflow is restricted by $2^{-bl \cdot sd}$, where bl indicates the employed bit length of the arbitrary-precision operation and sd the number of the additional rounds (=digits) in the second section of the encryption. It is advisable to choose these numbers such that it preferably holds that bl·sd≥10, and most preferably bl·sd≥100, and to accordingly do without an explicit check for overflow. Should an overflow nevertheless happen to occur, the result can be transmitted to the reader 30*a* without modular reduction.

In the third section of the encryption, the encrypted output data are finally generated successively, being consequently transmittable to the reader 30a in overlap with the end of the computation. This is especially advantageous since the data cannot be transmitted in a single transfer step (data block) anyway due to the length of the ciphertext C* (a ciphertext of 128 bytes resulting at the usual and necessary length of the modulus n of 1024 bits). Commercially usual UHF-RFID readers (according to ISO/IEC 18000-63) are not arranged for transferring larger data blocks, but limit the block size to 2 to 16 bytes according to the prior art. Through the transfer of the data of the ciphertext C* in sections (so-called chaining), the data are transferred in portions in sequential order. The resulting overlap between computation and transfer can be utilized very advantageously to the effect that the computation can already be begun after the reception of the first data in parallel with the data transfer.

FIG. 4 shows an algorithm ("MontgomerySquare") for computing the ciphertext C*, i.e. for encrypting the plaintext M, by the RFID tag 20a. For the following description of this algorithm the following definitions are helpful. It is assumed that the processor unit 25 of the RFID tag 20a has a word width of bl bits. The processor unit 25 of the RFID tag 20a is configured to be able to multiply two bl—bit-wide words by each other, whereby the result can be up to $2 \cdot bl$ bits long. In a nonrestrictive way, it is further assumed that the modulus n has at most a length of d words and thus $d \cdot bl$ bits. According to a preferred embodiment of the invention, a security parameter sd is chosen such that the hereinabove described overflow probability is in the order of magnitude $2^{-bl \cdot sd}$. As the person skilled in the art will appreciate, a larger value of sd will cause a longer computing time. It is set nonrestrictively that $R=2^{bl \cdot (d+sd)}$. As already described hereinabove, R and/or the security parameter sd should preferably be chosen such that it preferably holds that $bl \cdot sd \geq 10$, and most preferably $bl \cdot sd \geq 100$.

For a plaintext M, which is a number with $0 \leq M < n$, the ciphertext C* can be computed with $C^* = M^2 \cdot R^{-1} \bmod n$ by means of the two following steps:

1. Compute an a such that it holds that: $a = -M^2/n \bmod R$, $0 \leq a < R$.
2. Set $C^* = (M^2 + a \cdot n)/R$ The division in the second step is executable without remainder. Since $0 \leq M < n$ it can be assumed for a randomly chosen M that the value a is likewise distributed uniformly in the interval $[0, \ldots, R-1]$. Thus, the probability for an overflow of C* (i.e. it holds that $C^* \geq n$) is at most equal to n/R, and thus at most equal to $2^{-bl \cdot sd}$.

For an integer x let $(x_0, x_1, \ldots, x_i, \ldots, x_{v-1})$ be the representation of x to the base $2^{bl}$, i.e. it holds that $x = \sum_{i=0}^{v-1} 2^{bl \cdot i} \cdot x_i$, $0 \leq x_i < 2^{bl}$. Let $(M_0, \ldots, M_{d-1})$, $(n_0, \ldots, n_{d-1})$, $(a_0, \ldots, a_{d+sd-1})$, and $(C^*_0, \ldots, C^*_{d-1})$ be the representations of M, n, a and C* to the base $2^{bl}$. Further, let $n_{inv}$ be the integer uniquely determined by $n \cdot n_{inv} = -1 (\bmod 2^{bl})$ and $0 \leq n_{inv} < 2^{bl}$. Then a and C* can be computed according to the "MontgomerySquare" algorithm represented in FIG. 4, it being heeded that the binary digits $C^*_0, \ldots, C^*_{d-1}$ of C* are designated with $c_{i-s-sd}$ in the algorithm represented in FIG. 4.

With regard to the "MontgomerySquare" algorithm represented in FIG. 4, the person skilled in the art will appreciate the following.

After i runs through the main loop it holds that $\alpha = -M^2/n (\bmod 2^{bl \cdot \min(i, d+sd)})$ and in the case $i > d+sd$ it moreover holds that $C^* = (M^2 + a \cdot n)/R(\bmod 2^{bl \cdot (i-d-sd)})$. In the ith run through the main loop, only the first i input values $M_0, \ldots, M_{i-1}$ are required, so that this run can already be carried out after the first i input values are available. The ith output value can already be output after i+s+sd runs through the main loop. Thus, the above-described overlap of input, processing and output is readily possible according to the invention.

Of the intermediate value a at most the digits $a_i, \ldots, a_{i-d+1}$ are required in the ith run through the main loop, so that d words with bl bits each are sufficient for storing the part of a required at any given time.

The algorithm requires altogether at most $(d+1)(3d/2+sd)$ multiplications.

According to a preferred embodiment of the invention, the modulus n is chosen, for saving computing time, as follows: $n=1(\bmod 2^{bl \cdot nd})$, where nd is an integer with $1 \leq nd < d$. In this case it holds that $n_{inv} = 2^{bl} - 1$. The multiplication by $n_{inv} = 2^{bl} - 1$ (modulo $2^{bl}$) is then a simple negation. Apart from the last digit $n_0$, the low-order digits $n_{nd-1}, \ldots, n_1$ of n are then equal to zero, so that $nl \cdot (d+sd)$ multiplications can be saved in comparison to the above-described "MontgomerySquare" algorithm. If one chooses e.g. $nl = d/2$, the number of the multiplications is in the order of magnitude $d(d+sd)$. This saves about one third of the multiplications in comparison to the above-described "MontgomerySquare" algorithm. Prime numbers p, q with $\log p \approx \log q$, $2^{bl \cdot d - 1} < n = p \cdot q < 2^{bl \cdot d}$ and $n = p \cdot q = 1 (\bmod 2^{bl \cdot d/2})$ can be easily constructed. The stated condition for n means that the bits of the lower half (except for the last bit) are equal to zero in the binary representation of n. According to the developments of research known today, this does not signify any restriction for the security of the method. The fastest currently known algorithm for factorizing arbitrary numbers n is the General Number Field Sieve (GNFS). The only known considerably faster algorithm that, under certain circumstances, can factorize a number $n = p \cdot q$, with $\log p \approx \log q$ for prime numbers p, q, is the Special Number Field Sieve (SNFS). However, for a randomly chosen $n = p \cdot q$ in which the lower half of the bits (except for the last bit) is equal to zero, the SNSF cannot be applied.

As the person skilled in the art will appreciate, the individual steps of the communication protocol represented in FIG. 3 need not necessarily take place in the represented time sequence. This is evidently only required where the results of a step constitute the input data of a further step. Further, the person skilled in the art will appreciate that although preferred embodiments of the invention have been described hereinabove with reference to an RFID tag which is preferably a UHF tag according to ISO/IEC 18000-63 or Class-1 Gen-2 EPC, the invention can likewise be used advantageously with other types of limited-resource portable data carriers that must authenticate themselves to a reader via the over-the-air interface, such as for example contactless chip cards, tokens and the like.

The invention claimed is:

1. A method for secure communication between a radio frequency identification (RFID) tag and an RF reader, the RFID tag comprising a storage unit and a processor unit, and the RF reader comprising a storage unit and a processor unit, wherein the method comprises:
   the RFID tag encrypting a plaintext M, into which an identification element (UII) of the RFID tag is incorporated, for computing a ciphertext C* by computing a Montgomery residue of a square of the plaintext M modulo n with respect to a Montgomery base R, i.e. $C^* = M^2 R^{-1} \bmod n$, and after encrypting the plaintext M, the RFID tag sends an authentication message over-the-air to the RF reader, the authentication message being based on the ciphertext C*, the RF reader receiving, recording and processing the authentication message in order to interpret the secure communication, wherein the RF reader uses a modulus n=p·q as a public key, prime numbers p, q as a private key, and the Montgomery base R as an integer that is larger than the modulus n wherein data incorporated into the plaintext M is scrambled by means of an interleaving operation in order to distribute random data stemming from the RF reader and from the RFID tag randomly over the plaintext M.

2. The method according to claim 1, wherein the authentication message transferred from the RFID tag to the reader contains the encrypted plaintext M in a form of the ciphertext C* with C*=M²R−1 mod n.

3. The method according to claim 1, wherein there are further incorporated into the plaintext M a first random number RND1 generated by the reader and a second random number RND2 generated by the RFID tag, wherein the first random number RND1 is transferred to the RFID tag as a challenge within a framework of a challenge-response method.

4. The method according to claim 3, wherein the RFID tag is configured such that the RFID tag can begin with an encryption during a read-in of the challenge in form of the first random number RND1, and first bytes of the computed ciphertext C* can already be output to the reader while subsequent bytes of the ciphertext C* are still being computed.

5. The method according to claim 1, wherein there is further incorporated into the plaintext M a digital signature (SIG(UII)) of the identification element (UII) of the RFID tag, which is deposited in a storage unit of the RFID tag and can be checked by the reader.

6. The method according to claim 1, wherein the modulus n is chosen, for saving computing time, as follows: n=1(mod 2bl·nd), where nd is an integer with 1≤nd<d, bl is a word width of the processor unit of the RFID tag, and d is a length of the modulus n in word widths of the processor unit.

7. The method according to claim 1, wherein the Montgomery base R is chosen for a given modulus n as follows: R=2bl·(d+sd), where bl is a word width of the processor unit of the RFID tag, d is a length of the modulus n in word widths of the processor unit, and sd is a security parameter which is so chosen that it holds that bl·sd≥1.

8. A method for secure communication between a radio frequency identification (RFID) tag and an RF reader, the RF reader comprising a storage unit and a processor unit, and the RFID tag comprising a storage unit and a processor unit, wherein the method comprises:

the RF reader receiving over-the-air from the RFID tag an authentication message which is based on a ciphertext, i.e. C*=M²R⁻¹ mod n, comprising an encrypted plaintext M, which was encrypted by the RFID tag, into which an identification element (UII) of the RFID tag has been incorporated, and after receiving the plaintext M, the RF reader decrypts the encrypted plaintext M, a decrypting step comprising multiplying the encrypted plaintext M by a Montgomery base R and subsequently carrying out a modulo operation with the modulus n, wherein the RF reader uses a modulus n=p·q as a public key, prime numbers p, q as a private key, and the Montgomery base R as an integer that is larger than the modulus n, wherein data incorporated into the plaintext M is scrambled by means of an interleaving operation in order to distribute random data stemming from the RF reader and from the RFID tag randomly over the plaintext M.

9. The method according to claim 8, wherein the authentication message transferred from the RFID tag to the reader contains the encrypted plaintext M in a form of the ciphertext C* with C*=M²R−1 mod n.

10. The method according to claim 8, wherein there are further incorporated into the plaintext M a first random number RND1 generated by the reader and a second random number RND2 generated by the RFID tag, wherein the first random number RND1 is transferred to the RFID tag as a challenge within a framework of a challenge-response method.

11. The method according to claim 10, wherein the RFID tag is configured such that the RFID tag can begin with an encryption during a read-in of the challenge in form of the first random number RND1, and first bytes of the computed ciphertext C* can already be output to the reader while subsequent bytes of the ciphertext C* are still being computed.

12. The method according to claim 8, wherein there is further incorporated into the plaintext M a digital signature (SIG(UII)) of the identification element (UII) of the RFID tag, which is deposited in a storage unit of the RFID tag and can be checked by the reader.

13. The method according to claim 8, wherein the modulus n is chosen, for saving computing time, as follows: n=1(mod 2bl·nd), where nd is an integer with 1≤nd<d, bl is a word width of a processor unit of the RFID tag, and d is a length of the modulus n in word widths of the processor unit.

14. The method according to claim 8, wherein the Montgomery base R is chosen for a given modulus n as follows: R=2bl·(d+sd), where bl is a word width of a processor unit of the RFID tag, d is a length of the modulus n in word widths of the processor unit, and sd is a security parameter which is so chosen that it holds that bl·sd≥1.

15. A radio frequency identification (RFID) tag for secure communication with RF reader, wherein the RFID tag comprises a processor and memory into which an identification element (UII) is deposited, and wherein the processor is configured for encrypting a plaintext M into which the identification element (UII) of the RFID tag is incorporated, for computing a ciphertext C* by computing a Montgomery residue of a square of the plaintext M modulo n with respect to a Montgomery base R, i.e. C*=M²R⁻¹ mod n, and transmitting an authentication message over-the-air to the RF reader, the authentication message being based on the ciphertext C*, wherein modulus n=p·q is a public key of the RF reader, prime numbers p, q are a private key of the RF reader, and the Montgomery base R is an integer that is larger than the modulus n, wherein data incorporated into the plaintext M is scrambled by means of an interleaving operation in order to distribute random data stemming from the RF reader and from the RFID tag randomly over the plaintext M.

16. An radio frequency (RF) reader for secure communication with a radio frequency identification (RFID) tag:
  wherein the RF reader comprises memory and a processor which is configured for receiving over-the-air from the RFID tag an authentication message which is based on a ciphertext, i.e. $C^* = M^2 R^{-1}$ mod n, comprising an encrypted plaintext M, which was encrypted by the RFID tag, into which an identification element (UM) of the RFID tag has been incorporated, and
  decrypting the encrypted plaintext M, wherein upon decryption the encrypted plaintext M is multiplied by a Montgomery base R and subsequently a modulo operation with modulus n is carried out,
  wherein modulus n=p·q as a public key of the RF reader, prime numbers p, q are a private key of the RF reader, and the Montgomery base R is an integer that is larger than the modulus n,
  wherein the RF reader is configured such that data incorporated into the plaintext M is scrambled by means of an interleaving operation in order to distribute random data stemming from the RF reader and from the RFID tag randomly over the plaintext M.

* * * * *